March 11, 1969  A. PHILLIPSON ET AL  3,431,697
PACKAGING OF PHONOGRAPH RECORDS
Filed Aug. 9, 1965  Sheet 1 of 3

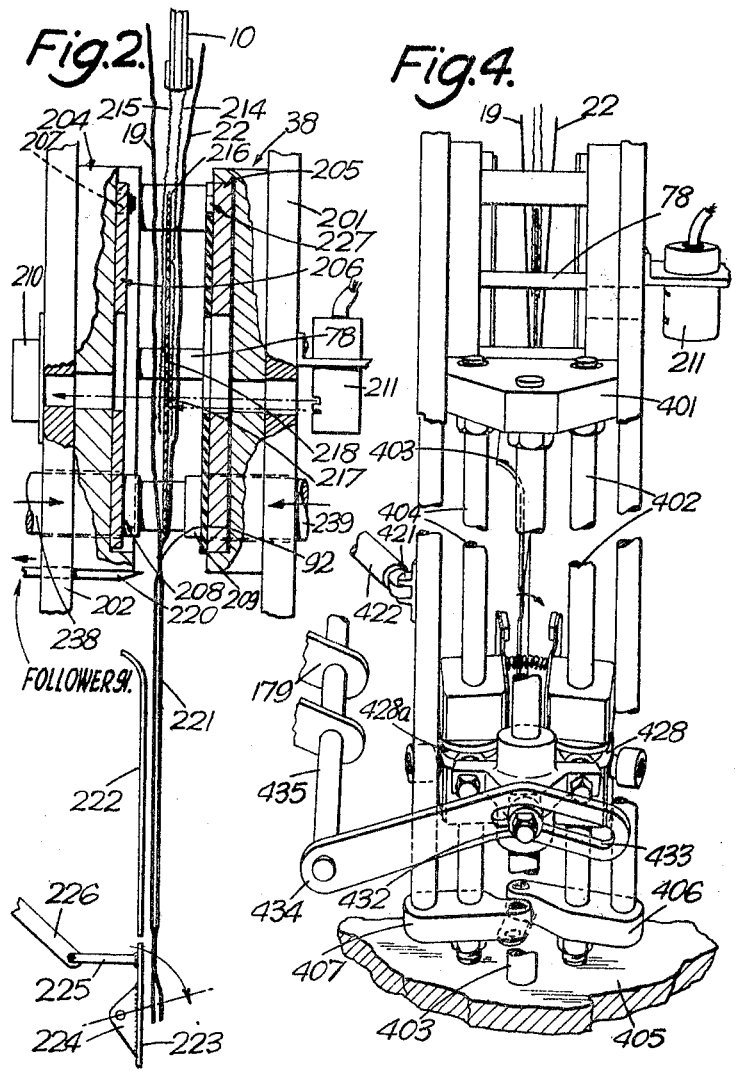

March 11, 1969   A. PHILLIPSON ET AL   3,431,697
PACKAGING OF PHONOGRAPH RECORDS
Filed Aug. 9, 1965
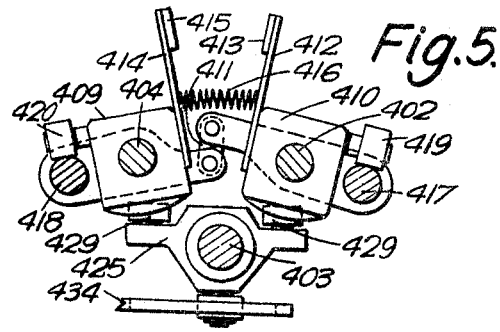
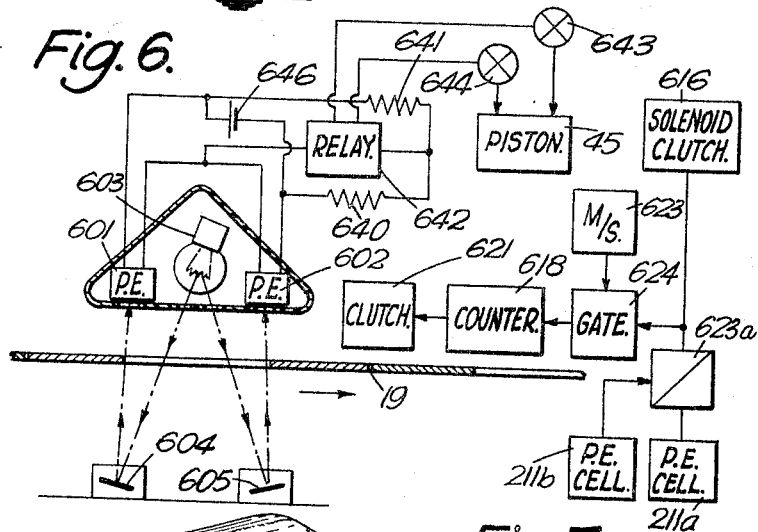
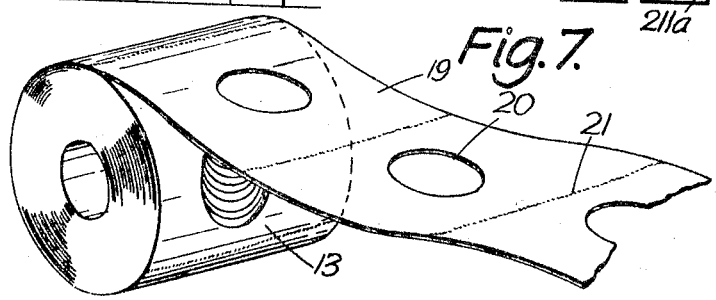

United States Patent Office 3,431,697
Patented Mar. 11, 1969

3,431,697
PACKAGING OF PHONOGRAPH RECORDS
Alan Phillipson, Basil Harry Royston Spiller, Robin Smith, and Harry Cheesman, London, England, assignors to Decca Limited, London, England, a British company
Filed Aug. 9, 1965, Ser. No. 478,072
Claims priority, application Great Britain, Aug. 13, 1964, 33,059/64
U.S. Cl. 53—51
Int. Cl. B65b 57/04, 51/30, 9/12
11 Claims

ABSTRACT OF THE DISCLOSURE

An apparatus for packaging phonograph records in paper bags with holes in the sides of the bags so that the record label on each side of the record can be clearly seen. The records are fed one by one to an operating position between two elongate strips of paper which have formed in them holes about the size of a record label, at intervals slightly greater apart than the width of the record. When in the operating position a pair of heat sealing dies heat seal the strips together to form a bag containing the record and subsequently the strips are traversed a distance equal to that between successive holes so that the apparatus is then ready to form the next bag containing a record. In order to ensure proper formation of the bags synchronously driven embossed capstans engage the holes in the strips to control the longitudinal position of the strips, the capstans being driven in synchronism with the traversing apparatus for the strips. Additional control means for the longitudinal position of the strips are provided by a photocell arrangement which senses the variation of a position of a hole in a strip from a datum when the strip is stationary and increases or reduces back tension on the respective strip.

This invention relates to the packaging of phonograph records and has for its principal objects to provide a method and apparatus for automatically putting into containers phonograph records produced in rapid succession. Such packaging apparatus finds particular use in conjunction with automatic record making apparatus (such as is described and claimed in the specifications of co-pending British patent applications Nos. 36,328/63 and 36,305/63) in which the sound track is embossed on a pre-formed blank disc and which enables records to be produced automatically in rapid succession.

According to this invention, a method of packaging phonograph records comprises the steps of feeding the records in succession between two strips of flexible sheet material, heat sealing the two strips of sheet material together at least partly around the record to form a bag containing the record and traversing the strips with the record between before the next record is inserted. Conveniently paper is used as the sheet material and it may be formed into a container similar to the well known paper containers for phonograph records by sealing along the two edges of the strip and across the width of the strip.

The method described above provides a series of phonograph records arranged between two strips which are sealed together at least partially around each record. The strip-like assembly may be cut so that each record is in an individual bag but, very conveniently, the assembly is folded in a zig-zag fashion and cut to form assemblies of a predetermined number, e.g., 25 records. The strips of sheet material may be preforated between the records to facilitate subsequent tearing off of each record bag when a single record is required.

Using heat sealing of strip material in the manner described above it is convenient to seal the strips together in such a manner as at least partially to close the bag, thereby preventing the removal of a record from the bag without breaking the seal. Thus a purchaser can be assured when buying a record that it has not been used or removed from the bag since it left the manufacturer.

The invention further includes within its scope an apparatus for packaging phonograph records, comprising feed means for feeding the records in succession to an operating position between two strips of flexible sheet material which lie parallel to one another, means for heat sealing the two strips of sheet material together at least partly around the record to form a bag containing the record and means traversing the sheet material with the record between them so as to draw further sheet material into the operating position ready to form a bag for the next record.

Conveniently the drive for the sheet material is operated intermittently in steps in synchronism with the feeding of the records to the operating position. The drives for the two strips may drive separate capstans which are geared together and have pawls to ensure one rotation for each step and thereby to control the amount of paper fed for each record.

The heat sealing may be effected by means of a pair of heated dies which can be closed together. In such an arrangment it is essential that the record should be properly located so that the dies are brought together on the parts of the paper around the record and conveniently photoelectric sensing means are provided to sense that the record is in the correct position. For heat sealing the paper together, conveniently electrically-heated metal dies covered with silicone rubber are employed, the dies being provided with air cooled asbestos shields to keep the heat from damaging the record. The record may be fed by gravity into the operating position between the dies, falling onto suitable stops, e.g., cork-faced stops on either side of the centre of the record and the photoelectric sensing means may be arranged to give an output signal for operating the dies only when the record is resting on the stops.

Conveniently the paper strips have central circular apertures so that the phonograph record labels may be visible and in this case, means must be provided for ensuring that the strips are properly located, with the apertures in the appropriate position with respect to the record before the strips are sealed together. For this purpose the capstans for the strips may comprise drums with upstanding locating means, for example shallow bosses on the peripheral surfaces of the drums, adapted to engage in the apertures in the paper strip. If paper strips are employed, the possibility of slipping arises and preferably automatic control means are provided for adjusting the tension on the paper strip; such control may be effected by photoelectric means sensing the position of the holes in the strip. The tensioning means may comprise, for each strip, a movable guide over which the paper strip runs which guide is moved by a pneumatic cylinder controlled from the photoelectric sensing means.

As previously indicated, this apparatus finds particular use in conjunction with automatic record making apparatus. In such an arrangement, preferably the records from the record making apparatus are fed into a temporary store, for example a carrier rotatable about a vertical axis and holding a number of records in vertical radial planes, so that a sample record may be checked by listening as it is played before any of the records are fed into the packaging apparatus. In such an arrangement the temporary store would be arranged to hold at least twice the number of records corresponding to the time required to play the sampled record so that, if any defect is found, the record making and packaging apparatus can be stopped before packing has commenced of any records produced after the defective one.

If the records in their bags are assembled in a zig-zag fashion, they may be fed from the operating position into a horizontal platform which is lowered in steps, one for each successive record, the steps being equal to the thickness of a record and its container.

In the following description, reference will be made to the accompanying drawings, in which:

FIGURE 2 is a section view of part of the apparatus shown in FIGURE 1;

FIGURE 4 is a perspective view of a paper advancing mechanism;

FIGURE 5 is a plan view of part of the mechanism shown in FIGURE 4;

FIGURE 6 illustrates diagrammatically one control circuit for use with FIGURE 1; and FIGURE 7 shows a roll of strip material for use in the apparatus shown in FIGURE 1.

Figure 1:
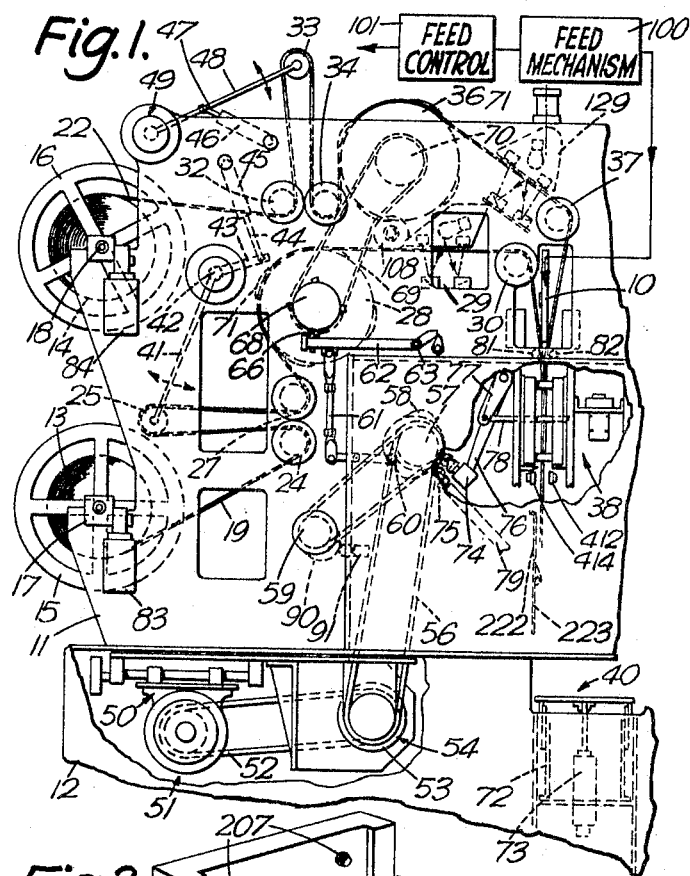
FIGURE 1 illustrates diagrammatically a side view of a packaging apparatus according to the invention.

This apparatus is more particularly intended for use with a record producing apparatus producing records at the rate of about 20 per minute. A feed mechanism providing records at this rate is diagrammatically shown in FIGURE 1 at 100, providing records at a regular rate controlled by the feed control 101 down the vertical chute 10. The feed mechanism may take a number of forms and since it does by itself not form any part of this particular invention, it will not be further described.

The packaging mechanism in accordance with this invention is mounted on the vertical bracket 11 upstanding from the motor cabinet 12. The paper strips of sheet material which are used to package the records are obtained from the rolls 13 and 14 mounted respectively on the spools 15 and 16 which are themselves rotatable in bearings 17, 18 respectively in the bracket 11. A roll 13 is shown in more detail in FIGURE 7 from which it will be seen that the strip of sheet material 19 has circular holes 20 formed in it at regular intervals the strip 19 being perforated between holes at the perforation 21, the distance between perforations being the depth of a record container ultimately formed, being thus slightly greater than the diameter of a record.

The paper strip 19 from roll 13 is fed over the roller 24, over tensioning roller 25 and roller 27, over the capstan 28, roller 30 and guide bar 81 to the heat sealing apparatus denoted generally by the numeral 38. In like manner, the paper strip 22 is fed over roller 32, over tensioning roller 33, over roller 34 and over capstan 36, the inner portion of pulley 37 to the guide bar 82 and to the heat sealing apparatus 38, where, in a manner to be described, the two strips are heat sealed round a record and passed to the loading platform 40, from which a series of bags each containing a record may be removed from the machine.

The paper strips 19, 22 are advanced together in steps by repeated downward movement of fingers 413 and 414 which, as is explained with reference to FIGURES 4 and 5, are moved to an upper position just below the heat sealing apparatus 38, moved together to grip the strips of paper between them, and are then traversed downwardly a distance corresponding to the height of a record bag. It will be apparent that the strips of paper may move out of alignment (i.e. with holes 20 in corresponding bag portions moving out of coincidence). Such a tendency is corrected by altering the back tension applied to one or other of the strips. When stationary in the position required for heat sealing a record into the appropriate bag, the strips are arranged to be adjacent the photoelectric position sensing assemblies 29, 129 respectively. As shown later with reference to FIGURE 6, if the hole in the portion of a strip adjacent one of the assemblies 29 or 129 is forward or backwards from a datum position, a signal operates an appropriate valve to increase or decrease the pressure in the respective pneumatic piston 45 or 46. The piston 45 is coupled to link 43, pivoted at 42, and the arm 41 to move the "dancing" roller 25 to a position corresponding to the pressure in the piston. Likewise, piston 46 moves "dancing" roller 33 to a position corresponding to the pressure in piston 46 via piston rod 47 and arm 48 (pivoted at pivot 49). As the strip 19 is drawn forward, roller 25 is moved towards roller 26 and the slack taken up by the advancing mechanism (capstan 28 being released at an appropriate time). An increase of back tension applied by roller 25, resulting from the strip 19 being initially slightly forward from a datum, will cause a slight increase in the stretch of strip 19 to move it back into its correct position relative to the record. A decrease in the back tension will reduce the stretch applied enabling the strip to move relatively forward to the correct datum position. As the arms 41, 48 move with rollers 25, 33 they operate respective microswitches to start motors (indicated diagrammatically at 83 and 84) to enable the spools 15, 16 to pay off the strips 13 and 14.

The heat sealing apparatus and the operation for severing a series of bags are operated from main camshaft 57 and secondary camshaft 59 respectively. Drive for the camshaft 57 is derived from motor 50, driving output pulley 51 coupled to pulley 54 via band 52, pulley 54 driving coaxial pulley 53 to rotate camshaft 57 via band 56.

Engaging cams 58 on shaft 57 are a plurality of cam followers operating the heat sealing and advancing apparatus. For convenience, the operation of the machine will be described with reference to an appropriate timing sequence, and the various parts of the apparatus described in the order in which they operate. It will be apparent that camshaft 57 operates cams for both sides of the machine, but for simplicity the operative connection has been shown for one side only.

Figure 3:
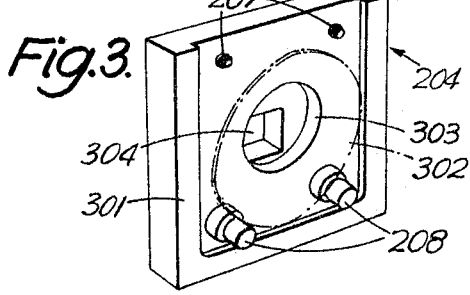
FIGURE 3 is a perspective view of a movable heat sealing platen.

The cycle of operation of the machine commences with the arrival of a record from the feed chute 10. The record falls by gravity against the stops 208, 209 which are movable relative to mounting plate 201 and 202. At the start of the cycle, the pairs of stops 208 and 209 are in contact, causing the record to come to rest in the position shown by the chain line 302 in FIGURE 3 and by the disc section 216 in FIGURE 2. In this position, the double photocell 211 receives light from lamp 210. Photocell 211 is comprised of two photocells 211a and 211b, as shown in FIGURE 6, which are coupled to gate 623a arranged to give an output only when light is received by upper cell 211a through gap 217 between the inner and outer portions of the record, and when light is cut off from lower cell 211b by the inner portion of record 216. The output from gate 623a is fed to solenoid clutch 616 enabling motor 50 to drive shaft 57 through one revolution, i.e. one complete cycle of operation of the machine.

As soon as the camshaft 57 begins to move (i.e. at 0°), follower 74 begins to rise, drawing platen 205 up to the record 216 by movement of link 76, radius arm 77 and pull rod 78. Platen 205 is moved to a position adjacent record 216, but which does not altar the position of record 216. At the same time, a corresponding cam follower moves the platen 204 via appropriate linkage and push rod (not shown for simplicity) adjacent the other side of record 216. Movement of platen 205 is completed at 35°, the movement of platen 204 continuing until 45° so that the record 216 is firmly held between the platens. One of the cam followers is conveniently spring loaded to prevent excess pressure being exerted on the record or the other platen.

Cam follower for platen 204 continues on a "dwell" up to 105°, the period between 45° and 105° (typically about half a second) being used for heat sealing. The platens are kept constant temperature by any convenient thermostatically controlled electrical heating means, and are arranged to seal the strips together with a U-shaped seal around three sides of the record, with two spot seals partially closing the fourth side. The paper strips 19, 22 are of course provided with a suitable coating, on the inner side, to provide adhesion when the strips are heat sealed. Platen 204 is shown in perspective in FIGURE 3, and comprises a raised U-shaped peripheral portion 301 with asbestos shielding 206 (FIGURE 2) covering the remainder of the same face of the platen, the asbestos having a circular aperture 303 opposite aperture 304 in platen 204, permitting light from lamp 210 to reach cell 211 and preventing sealing of the fibreglass strips 214, 215 which hang down from chute 10 between the record and the paper strips to prevent the lower edge of the record from catching in a hole in one of the strips 19, 22.

Platen 205 corresponds in profile with platen 204 except that apertures 227 in the asbestos are provided in place of the raised protuberances 207 which provide the spot seal.

At 103°, cam follower for platen 204 beings to lower followed by follower 74 to 110°, both followers being fully lowered to 145° to lower dwells at which they remain for the rest of the cycle.

At 135°, the fingers 412 and 414 have risen to a position in which they may grip the strips 19, 22 just above the serrated line 92 which is immediately below the heat sealing assembly 38. The mechanism for advancing the pads is shown in more detail in FIGURES 4 and 5. Slidably mounted on rods 402 and 404 are blocks 409 and 410, carrying fingers 414 and 412 respectively, pads 415 and 413 being mounted thereon. Spring 416 urges the fingers 412 and 414 apart. Rods 402 and 404 are rigidly mounted in plate 401 at the upper end and in plate 405 at the lower end. Also mounted on rods 402 and 404 are flat trunnion plates 406 and 407 respectively which are linked together by link 411, and which carry the lower ends of rods 417 and 418 respectively. It will be understood that corresponding members are provided at the upper ends of rods 417 and 418 to keep the rods parallel.

Mounted on blocks 409 and 410 are rollers 420 and 419 bearing against rods 418 and 417, the spring 416 maintaining the rollers against the rods. The blocks are moved up and down by shuttle 425 slidably mounted on rod 403 which is secured at its two ends in block 401 and plate 405. Rollers 429 and 429a engage slots 428 and 428a respectively in finger holders 409 and 410. Shuttle 425 is moved upwardly and downwardly by opposite rotations of bar 435 moving radius arm 434 which bears slot 433 engaged by pin 432 on the shuttle. Bar 435 is linked to cam follower 75 via trunnion 179.

The fingers 412 and 414 are moved together by thrust applied to push rod 422 coupled by link 421 to rod 418; push rod 422 is coupled to a further cam follower engaging a further cam 58 on shaft 57.

For simplicity, only the strip advancing mechanism for one side of the strips has been described: a further mechanism is provided for operating a further pair of pad bearing fingers located on the other side of the strips 19, 20.

During the early part of the cycle, cam follower 75 is on a "dwell," corresponding to a position of fingers 412 and 414 just below the operative position. Between 130° and 145° of the machine cycle, the cam follower 75 is lowered to complete the rise of the fingers to the top position. Also at 130° the cam follower for push rod 422 begins to rise, closing the fingers at 147° and completing its movement at 170°; the pads 413 and 415 are therefore tightly clasped.

At 155° and 160°, cam followers for the rods 238 and 239 begin to be lowered by their cams, the rods moving stops 208 and 209 apart to permit the passage of the sealed bag. The movement of rods 238 and 239 is completed by 175°. Before this, at 160°, cam follower 60 is lowered by its respective cam to disengage the latch arm 62 from sprag 66 on capstan 28, thereby allowing capstan 28 to rotate. Capstan 28 is coupled to capstan 36 by pulley band 69, which passes over pulleys 68, 70 on the two capstans, and is tensioned by pulley 108. The capstan is fully released at 175°, the follower dwelling until 220°. Capstan 36 may have a sprag clutch which prevents the capstan and capstan 28 from moving backwardly.

At 175° (that is, when the stops 208, 209 have been fully opened) follower 75 begins to rise, the rising being complete at 255°, when the fingers 412 and 414 have been fully lowered and the paper strips pulled down a distance equal to the distance between perforations. When the sprag 66 has moved past clutch arm 62, the follower 60 is raised, conveniently between 220° and 235°. At 230° the rods 238 and 239 are moved by the raising of their respective cams and cam followers to close on the paper strips in readiness for stopping the next disc. The stop 208 reaches the end of its inward travel at 262° (well after the end of pull down at 255° and stop 209 the end of its travel at 270°. As with the platens 204 and 205, the stops are arranged so that the first stops (i.e. 208) to cease moving come to rest against the paper and the other stops 209 come to rest subsequently in a position in which pressure is exerted on the stationary stops 208, the pressure being relieved by suitable springs in the cam followers or the associated linkage.

When stops 209 have come to rest, the cam follower for rod 422 is lowered (from 275° to 290°) allowing the fingers 412 and 414 to open. The follower 75 is then lowered during 290° to 360°, the fingers rising to a position just below the separator bar 220.

The cycle of operation of the machine is now complete and has to be restarted by the arrival of another record through chute 10. There will naturally be provided suitable gating arrangements preventing the arrival of another record while a record is in the heat sealing apparatus 38. A gate for this purpose may be controlled by the output of cell 211 and gate 623.

Referring now to FIGURE 6, microswitch 623 is operated every time the main camshaft passes a suitable location early in the cycle. A signal from the microswitch is gated with the signal from gate 623a by gate 624 and fed to the counter 618. The counter is set to a desired number of records and is arranged, when the number in the counter reaches the desired number, to feed a signal to a solenoid operated clutch 621. This clutch allows the secondary shaft 59 to be driven by the main shaft. The secondary shaft 59 is driven through one complete revolution during the remaining part of the cycle of rotation of the main shaft and the coupling (shown in FIGURE 1 as a belt drive) has to be arranged accordingly. The secondary shaft bears cam 90 raising follower 91 to advance the bar 220 from left to right. The bar 220 is shown in end section in FIGURE 2: it runs the whole width of the strips 19, 20 so that the advance of the bar will sever the strips at the adjacent perforations 92, allowing a series of connected bags to be removed from platform 40.

The sealed bags are folded in zig-zag fashion on platform 40, which is lowered step by step to keep the top of the pile of bags at constant height by suitable cam operated valves operating piston 73. As the strip of bags is pulled down past fixed guide 222, push rod 226 moves link 225 to move the movable guide 223 (pivoted at 224) to strike the top of the bag adjacent thereto, thereby assisting the movement of the fold away from the guide. For alternate folds, the movable guide will not strike the adjacent bag: since the alternate folds are directly below the bag 221, no assistance in making the alternate folds is necessary.

Although the capstans 28, 36 have upstanding portions 71 engaging the holes in the strips 19, 20 so that the strips are kept thereby approximately aligned, it is necessary to adjust the back tension to provide fine adjustment. A photo sensing arrangement 29 is shown in FIGURE 6. The resistive photocells 601 and 602 are arranged to receive light from lamp 603 reflected from mirrors 604 and 605 respectively. If the strip is correctly positioned, light from the lamp 603 can just pass to the cells 601 and 602 which are spaced apart by the diameter of hole 20. If the strip 19 is not properly positioned with respect to this datum, the bridge circuit formed by the cells and standard resistors 640 and 641 will be out of balance. A sensing relay 642 signals either of solenoid valves 643 and 644 which are arranged to increase or decrease the pressure in piston 45, according to whether cell 601 or cell 602 is cut off, pressure being derived from a suitable reservoir (not shown). To prevent operation of the sensing arrangement 29 at an inappropriate time (for example, when strip 19 is moving) the coupling from relay 642 to valves 643 and 644 may be via gates opened only when a signal is received from microswitch 623.

We claim:
1. Apparatus for packaging phonograph records, comprising:
   feed means for feeding the records in succession to an operating position between two strips of flexible sheet material which lie parallel to one another;
   said feed means comprising a feed chute permitting a record to fall by gravity to said operating position, first and second pairs of stops movable normal to the plane of the record from opposite directions thereto to maintain, when closed, said record in said operating position;
   light sensing means disposed adjacent said operating position producing a control signal when a record is in said operating position;
   means for heat sealing the two strips of sheet material together at least partly around the record to form thereby a bag containing the record;
   means traversing the strips of sheet material with a record between them so as to draw further sheet material into said operating position ready to form a bag for the next record; and
   drive means operatively coupled to said dies and said traversing means;
   said drive means being operative to drive said dies and said traversing means for one cycle of operation, said drive means being coupled to receive said control signal therefor.

2. The structure recited in claim 1 wherein separate capstans with upstanding bosses engage said strips, said capstans being coupled to rotate in synchronism, there being provided drive means for said capstans and a clutch therefor, said clutch being coupled to said drive means and permitting the capstans to rotate through a fixed angle for each cycle of operation.

3. Apparatus for packaging phonograph records, comprising:
   feed means for feeding the records in succession to an operating position between two strips of flexible sheet material which lie parallel to one another;
   said feed means comprising a feed chute permitting a record to fall by gravity to said operating position, first and second pairs of stops movable normal to the plane of the record from opposite directions thereto to maintain, when closed, said record in said operating position;
   light sensing means disposed adjacent said operating position producing a control signal when a record is in said operating position;
   means for heat sealing the two strips of sheet material together at least partly around the record to form thereby a bag containing the record;
   said heat sealing means comprising a pair of heated dies movable in a plane normal to the record, said dies being shaped to provide a U-shaped seal around the record at at least one spot seal in the region between the upper arms of the U so as to provide a seal at least partially enclosing said record;
   means traversing the strips of sheet material with a record between them so as to draw further sheet material into said operating position ready to form a bag for the next record;
   drive means operatively coupled to said dies and said traversing means;
   said drive means being operative to drive said dies and said traversing means for one cycle of operation, said drive means being coupled to receive said control signal therefor;
   means for varying the back tension on a first strip;
   further photoelectric sensing means sensing the deviation of one of said holes in said first strip with respect to a datum, said further photoelectric sensing means being operatively coupled to said back tensioning means to control said back tensioning means in accordance with said deviation.

4. The structure recited in claim 3 wherein said back tensioning means comprises a dancing roller engaging said first strip, a pneumatic piston, and a pivoted arm coupled to said pneumatic piston and carrying said dancing roller.

5. The structure recited in claim 4 wherein said photoelectric sensing means comprises a pair of resistive photoelectric cells disposed adjacent a hole in said first strip when said strip is stationary, light means, mirror means disposed adjacent opposite edges of said hole to direct light from said light means to said cells when said hole is in a datum position, resistance means forming a bridge circuit with said cells, relay means coupled across a diagonal of said bridge and arranged to produce output signals when said bridge is unbalanced, valve means operative to receive said output signals and to vary the pressure in said piston in accordance therewith.

6. Apparatus for packaging phonograph records, said records each having a central label bearing portion and an outer soundtrack bearing portion, comprising:
   feed means for feeding the records in succession to an operating position between two strips of flexible sheet material which lie parallel to one another, said strips each having holes formed therein at intervals spaced apart at least slightly greater than the diameter of a record;
   means for heat sealing the two strips of sheet material together at least partly around the record while said record is in said operating position to form thereby a bag containing the record;
   means traversing the strips of sheet material with a record between them so as to draw further sheet material into said operating position ready to form a bag for the next record, said traversing means comprising at least one pair of fingers slidably mounted for movement in a direction parallel to said strips, means for advancing said fingers to a first position down-stream of said operating position, means for closing said fingers on said strips, means for moving said fingers downwardly a distance corresponding to the distance between successive holes in a strip and means for releasing said fingers; and
   control means for controlling the longitudinal positions of the strips relative to said traversing means and said record whereby when a record is in said operating position its central label bearing portion and a hole in each strip are all aligned;
   wherein said fingers are mounted on slidable members carried on a pair of parallel fixed rods located adjacent one of said strips down-stream of said operating position, said members each carrying a roller engaging a rod movable in the plane parallel to said fixed rods, said movable rods being coupled together to move in correspondence, one of said movable rods being coupled to operate said closing means and said releasing means.

7. Apparatus as set forth in claim 8 in which the heat sealing means comprises a pair of heated dies movable in a plane normal to the record, said dies being shaped to provide a U-shaped seal around the record and at least one spot seal in the region between the upper arms of the U so as to provide a seal at least partly enclosing the record.

8. Apparatus for packaging phonograph records, said records each having a central label bearing portion and an outer soundtrack bearing portion, comprising:

feed means for feeding the records in succession to an operating position between two strips of flexible sheet material which lie parallel to one another, said strips each having holes formed therein at intervals spaced apart at least slightly greater than the diameter of a record, said feed means comprising a feed chute permitting a record to fall by gravity to said operating position and two pairs of movable stops located so as to maintain when closed the record in said operating position;

means for heat sealing the two strips of sheet material together at least partly around the record while said record is in said operating position to form thereby a bar containing the record;

means traversing the strips of sheet material with a record between them so as to draw further sheet material into said operating position ready to form a bag for the next record; and control means for controlling the longitudinal positions of the strips relative to said traversing means and said record whereby when a record is in said operating position its central label bearing portion and a hole in each strip are all aligned.

9. Apparatus for packaging gramophone records, said records each having a central label bearing portion and an outer soundtrack bearing portion, comprising:

feed means for feeding the record in succession to an operating position between two strips of flexible sheet material which lie parallel to one another, said strips each having holes formed therein at regular intervals spaced at least slightly greater apart than the diameter of a record;

means for heat sealing the two strips of sheet material together at least partly around the record to form a bag containing the record;

traversing means traversing the strips of sheet material with a record between a distance equal to the spacing between successive holes in said strips, so as to draw further sheet material into said operating position ready to form a bag for the next record;

first and second capstans, said capstans each having embossed portions spaced at intervals around the periphery thereof, each capstan having its embossed portions engaging successive holes in a respective strip;

coupling means coupling the capstans together to ensure synchronized rotation thereof; and said traversing means being coupled to said capstans to rotate each capstan during the traversing of said strips each by a peripheral distance equal to the distance between successive holes in said strips.

10. Apparatus as set forth in claim 9 wherein said heat sealing means comprises a pair of heated dies movable in a plane normal to the record, said dies being shaped to provide a U-shaped seal around the record and at least one spot seal in the region between the upper arms of the U so as to provide a seal at least partly enclosing said record.

11. Apparatus as set forth in claim 9 further comprising:

light sensing means disposed adjacent said operating position producing a control signal when a record is in said operating position;

drive means operatively coupled to said dies and said traversing means;

said drive means being operative to drive said dies and said traversing means for one cycle of operation, said drive means being coupled to receive said control signal therefor.

References Cited

UNITED STATES PATENTS

| | | | |
|---|---|---|---|
| 2,156,466 | 5/1939 | Vogt | 53—180 X |
| 2,194,451 | 3/1940 | Soubier | 53—28 X |
| 2,608,809 | 9/1952 | Stroop | 53—180 |
| 2,695,483 | 11/1954 | Toews | 53—182 X |
| 2,951,322 | 9/1960 | McCorkle Wood | 53—180 X |
| 3,093,530 | 6/1963 | Lippman | 53—180 X |
| 3,168,016 | 2/1965 | Kehr | 53—180 X |
| 2,375,451 | 5/1945 | Waters | 53—51 X |
| 3,267,639 | 8/1966 | Ollier et al. | 53—51 |

FOREIGN PATENTS 712,485   7/1954   Great Britain.

THERON E. CONDON, *Primary Examiner.*

NEIL ABRAMS, *Assistant Examiner.*

U.S. Cl. X.R.

53—74, 180